(12) United States Patent
Huai

(10) Patent No.: US 8,451,993 B2
(45) Date of Patent: May 28, 2013

(54) DIAL-UP CONNECTION METHOD AND DEVICE OF MOBILE DATA TERMINAL

(75) Inventor: Yonglong Huai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/521,235

(22) PCT Filed: Jul. 23, 2010

(86) PCT No.: PCT/CN2010/075421
§ 371 (c)(1),
(2), (4) Date: Jul. 10, 2012

(87) PCT Pub. No.: WO2011/140737
PCT Pub. Date: Nov. 17, 2011

(65) Prior Publication Data
US 2013/0044868 A1 Feb. 21, 2013

(30) Foreign Application Priority Data
May 12, 2010 (CN) .......................... 2010 1 0172619

(51) Int. Cl.
*H04M 11/00* (2006.01)
(52) U.S. Cl.
USPC .................... 379/90.01; 379/93.05; 455/557; 455/556.1
(58) Field of Classification Search
USPC .... 379/90.01, 93.01–93.08, 110.01; 370/352; 455/456.6, 550.01, 556.1, 556.2, 557
See application file for complete search history.

(56) References Cited

U.S. PATENT DOCUMENTS

| | | |
|---|---|---|
| 6,349,224 B1 | 2/2002 | Lim |
| 2010/0074155 A1 | 3/2010 | Park |
| 2010/0174791 A1* | 7/2010 | Tian et al. ..................... 709/206 |

FOREIGN PATENT DOCUMENTS

| | | |
|---|---|---|
| CN | 101355479 A | 1/2009 |
| CN | 101702836 A | 5/2010 |
| EP | 1160673 A1 | 12/2001 |
| EP | 1322072 A1 | 6/2003 |
| WO | 0147296 A2 | 6/2001 |
| WO | 2010006650 A1 | 1/2010 |

OTHER PUBLICATIONS

International Search Report in international application No. PCT/CN2010/075421, mailed on Feb. 24, 2011.
English Translation of the Written Opinion of the International Search Authority in international application No. PCT/CN2010/075421, mailed on Feb. 24, 2011.
Supplementary European Search Report on European application No. 10851242.7, mailed on Feb. 25, 2013.

* cited by examiner

*Primary Examiner* — Melur Ramakrishnaiah
(74) *Attorney, Agent, or Firm* — Oppedahl Patent Law Firm LLC

(57) ABSTRACT

The present disclosure provides a dial-up connection method of a mobile data terminal, which includes: the mobile data terminal sets a value of a wireless dial-up state variable as "connected" after receiving an initial dial-up connection request from a user equipment and sets dial-up information, and maintains the value of the wireless dial-up state variable as "connected" after the user equipment disconnects an initial connection with the mobile data terminal; and the mobile data terminal sends a "successfully connected" message to the user equipment when determining, after receiving a non-initial dial-up connection request from the user equipment, the value of the wireless dial-up state variable is "connected" and dial-up information in the non-initial dial-up connection request is identical with the set dial-up information. The present disclosure also provides a dial-up connection device of a mobile data terminal. With the method and device, a mobile data terminal can realize a fast dial-up connection, thereby greatly shortening the time spent on the dial-up connection.

18 Claims, 3 Drawing Sheets

DIAL-UP CONNECTION METHOD AND DEVICE OF MOBILE DATA TERMINAL

TECHNICAL FIELD

The present disclosure relates to a dial-up connection technology in wireless communications, and more particularly to a dial-up connection method and device of a mobile data terminal.

BACKGROUND

With the widespread application and gradual popularization of the mobile wireless communication technology, mobile data terminal products, such as mobile phone, data cards with various interfaces, netbook, built-in communication module and router, are no longer a word representing high technology but becomes a daily living equipment or even a daily necessity. In order to satisfy the requirements of users on powerful functions and excellent performances of the mobile data terminal product, the competition among the manufacturers in the market becomes increasingly fierce, therefore all manufacturers are focusing on the development of increasing product functions and improving product performances.

In the existing wireless network environment, when a mobile data terminal is used to conduct a data transmission service, a user equipment needs to initiate a dial-up connection to the mobile data terminal to establish a connection between the user equipment and the mobile data terminal which is referred to as a wired connection in the following; meanwhile, the mobile data terminal also needs to initiate a dial-up connection to a core network server to establish a connection between the mobile data terminal and the core network server which is referred to as a wireless connection in the following. Wherein the wired connection is borne on a wired equipment such as a Universal Serial Bus (USB) or a serial port, while the wireless connection is borne on a wireless link. In general, the time spent on establishing a wired connection is less than 1 second, while the time spent on establishing a wireless connection is 1-75 seconds, depending on actual network environment, such as the congestion degree of the accessed core network server.

It can be seen from the description above that the time needed for a whole dial-up connection mainly depends on the time spent on the wireless connection, and the speed of wireless connection has a significant influence on application performance, thereby affecting the user experience degree, moreover, in an environment needing frequent dial-up connections, excessively frequent dial-up connections not only lead to increasing of the wireless signaling load, but also lead to a waste of wireless resources.

SUMMARY

In view of the problem above, it is the main object of the present disclosure to provide a dial-up connection method and device of a mobile data terminal, to enable the mobile data terminal to realize a fast dial-up connection.

In order to achieve the object above, the technical solution of the present disclosure is realized as follows.

A dial-up connection method of a mobile data terminal is provided in the present disclosure, which includes:

the mobile data terminal sets a value of a wireless dial-up state variable as "connected" after receiving an initial dial-up connection request from a user equipment, and sets dial-up information;

the mobile data terminal maintains the value of the wireless dial-up state variable as "connected" after the user equipment disconnects an initial connection with the mobile data terminal; and the mobile data terminal sends a "successfully connected" message to the user equipment, when determining, after receiving a non-initial dial-up connection request from the user equipment, the value of the wireless dial-up state variable is "connected" and dial-up information in the non-initial dial-up connection request is identical with the set dial-up information.

In the solution above, before the value of a wireless dial-up state variable and the dial-up information are set, the method may further include:

the mobile data terminal sets the value of the wireless dial-up state variable as "disconnected" and the dial-up information as null when the mobile data terminal is initialized.

In the solution above, when the value of the wireless dial-up state variable and the dial-up information are set, the method may further include: the mobile data terminal sends a dial-up connection request to a core network server and sets the value of the wireless dial-up state variable as "connected" after confirming a successful wireless connection.

In the solution above, the method may further include:

setting dial-up information according to dial-up information in a dial-up connection request from the user equipment, after receiving the dial-up connection request and determining the value of the wireless dial-up state variable is "disconnected";

sending a dial-up connection request to the core network server;

setting the value of the wireless dial-up state variable as "connected" after confirming a successful wireless connection; and sending a "successfully connected" message to the user equipment.

In the solution above, the method may further include:

when determining, after receiving a dial-up connection request from the user equipment, the dial-up information in the dial-up connection request is different from the set dial-up information, setting dial-up information according to dial-up information in the dial-up connection request received from the user equipment;

sending a dial-up connection request to the core network server;

setting the value of the wireless dial-up state variable as "connected" after confirming a successful wireless connection; and sending a "successfully connected" message to the user equipment.

A dial-up connection device of a mobile data terminal is further provided in the present disclosure, which includes: a setting unit, a determining unit and a sending unit, wherein the setting unit is configured to:

set a value of a wireless dial-up state variable as "connected" after receiving an initial dial-up connection request from a user equipment, and set dial-up information; and maintain the value of the wireless dial-up state variable as "connected" after the user equipment disconnects an initial connection with the mobile data terminal;

the determining unit is configured to trigger the sending unit after determining the value of the wireless dial-up state variable is "connected" and dial-up information in a non-initial dial-up connection request is identical with the set dial-up information, when receiving the non-initial dial-up connection request from the user equipment; and the sending unit is configured to send a "successfully connected" message to the user equipment after receiving triggering information from the determining unit.

In the solution above, the setting unit may be further configured to set the value of the wireless dial-up state variable as "disconnected" and the dial-up information as null when the mobile data terminal is initialized.

In the solution above, the setting unit may be further configured to:

send a dial-up connection request to a core network server; and set the value of the wireless dial-up state variable as "connected" after confirming a successful wireless connection.

In the solution above, the determining unit may include a first determination module and a second determination module, wherein the first determination module is configured to:

determine, after receiving a dial-up connection request from the user equipment, whether or not the value of the wireless dial-up state variable is "connected";

trigger the second determination module when determining the value of the wireless dial-up state variable is "connected"; and trigger the setting unit when determining the value of the wireless dial-up state variable is "disconnected"; and the second determination module is configured to:

determine, after the first determination module determines the value of the wireless dial-up state variable is "connected", whether or not dial-up information in the dial-up connection request is identical with the set dial-up information;

trigger the sending unit when determining the dial-up information in the dial-up connection request is identical with the set dial-up information; and trigger the setting unit when determining the dial-up information in the dial-up connection request is different from the set dial-up information.

In the solution above, the setting unit may be further configured to:

set dial-up information according to the dial-up information in the received dial-up connection request when the first determination module determines the value of the wireless dial-up state variable is "disconnected" or when the second determination module determines the dial-up information in the dial-up connection request is different from the set dial-up information;

send a dial-up connection request to the core network server;

set the value of the wireless dial-up state variable as "connected" after confirming a successful wireless connection; and trigger the sending unit after completing the setting; and the sending unit may be further configured to send a "successfully connected" message to the user equipment after the setting unit sets the dial-up information and the value of the wireless dial-up state variable.

In the dial-up connection method and device of a mobile data terminal provided in the present disclosure, the value of a wireless dial-up state variable is preset as "connected" and dial-up information is preset as well; after receiving a dial-up connection request from a user equipment, the mobile data terminal determines the value of the wireless dial-up state variable is "connected" and the dial-up information in the dial-up connection request is identical with the preset dial-up information, which indicates that the mobile data terminal has established a wireless connection with a core network server, without needing to establish a wireless connection with the core network server, and then a "successfully connected" message is directly sent to the user equipment, therefore, the mobile data terminal can realize a fast dial-up connection, which shortens the time spent on a dial-up connection greatly and improves the user experience.

DETAILED DESCRIPTION

The disclosure is described below in detail with reference to accompanying drawings in combination with specific embodiments.

Figure 1:
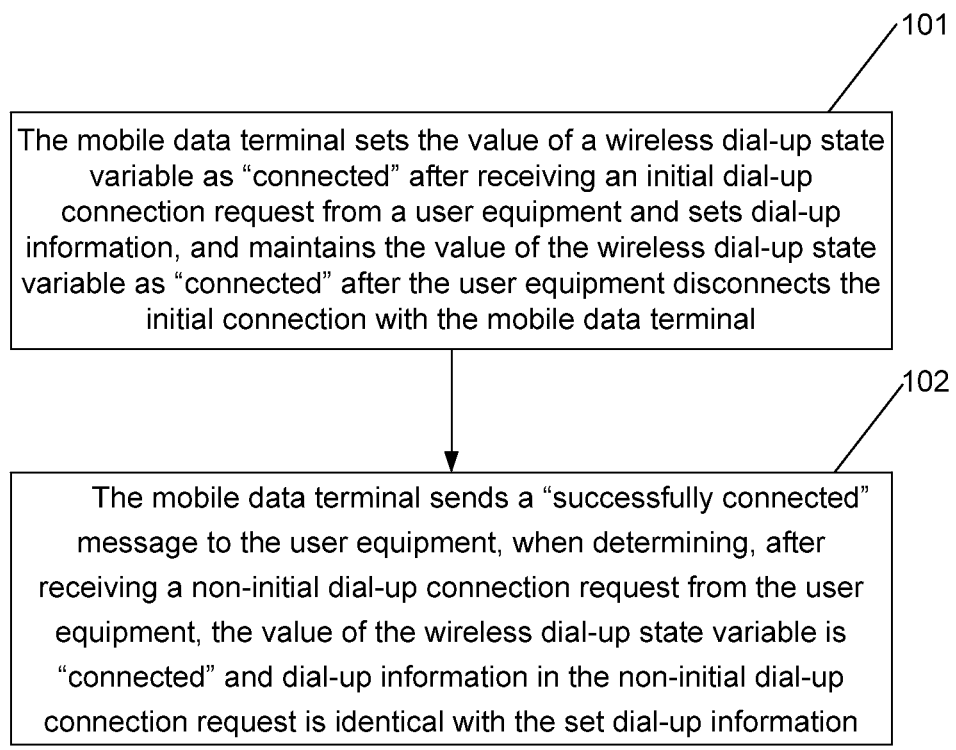
FIG. 1 is a schematic flowchart illustrating a dial-up connection method of a mobile data terminal according to the present disclosure.

As shown in FIG. 1, the dial-up connection method of a mobile data terminal provided in the present disclosure includes the following steps.

Step 101: the mobile data terminal sets the value of a wireless dial-up state variable as "connected" after receiving the initial dial-up connection request from a user equipment and sets dial-up information, and maintains the value of the wireless dial-up state variable as "connected" after the user equipment disconnects the initial connection with the mobile data terminal;

here, before the mobile data terminal sets the value of a wireless dial-up state variable as "connected" and sets dial-up information, the method further includes: the mobile data terminal sets the value of the wireless dial-up state variable as "disconnected" and sets the dial-up information as null when the mobile data terminal is initialized;

the initial dial-up connection request refers to the dial-up connection request initially sent by the user equipment to the mobile data terminal after the mobile data terminal was initialized, or refers to the dial-up connection request re-sent by the user equipment to the mobile data terminal after the user equipment has been disconnected from the mobile data terminal for a time longer than the time that is predetermined for a connection between a network side and the mobile data terminal, wherein the time of connection between the core network server and the mobile data terminal can be set by the core network server, and the predetermined time of connection between the network side and the mobile data terminal can be set to be 1 h, or 10 h or 1 day according to an actual demand; in generally, after the mobile data terminal receives the dial-up connection request from the user equipment, if the mobile data terminal determines the value of the wireless dial-up state variable as "disconnected" and the dial-up information is null, it can be determined that the current dial-up connection request from the user equipment is the initial dial-up connection request;

in this step, setting the value of the wireless dial-up state variable as "connected" and setting dial-up information specifically includes:

after receiving the dial-up connection request from the user equipment initially, the mobile data terminal sets dial-up information according to the dial-up information contained in the received dial-up connection request;

the mobile data terminal sends the dial-up connection request to a core network server, and sets the value of the wireless dial-up state variable as "connected" after confirming a successful wireless connection, wherein the user equipment may be a digital photo frame, a Point Of Sale (POS), an iPod, a Personal Computer (PC) and the like;

generally, after the wireless connection is established successfully, the core network server returns a "successfully connected" message to the mobile data terminal; the "successfully connected" message contains: resource allocation information, which are acquired by the mobile data terminal from the core network server and are necessary for a data transmission, authentication information and the like;

the dial-up information, which specifically includes an Access Point Name (APN), a user name and a password and the like, are contained in the dial-up connection request sent by the user equipment, wherein the APN refers to the name of the user equipment.

Step 102: after receiving a non-initial dial-up connection request from the user equipment, the mobile data terminal sends a "successfully connected" message to the user equipment, when determining the value of the wireless dial-up state variable as "connected" and the dial-up information in the non-initial dial-up connection request is identical with the set dial-up information;

here, the value of the wireless dial-up state variable is "connected", which indicates that a wireless connection has been established between the mobile data terminal and the core network server, therefore, after receiving a dial-up connection request, the mobile data terminal no longer needs to send a dial-up connection request to the core network server to establish a wireless connection with the core network server, that is, the mobile data terminal binds the current wired connection with the wireless connection, and determines the realization of the wireless connection and the wired connection as long as the dial-up information in the dial-up connection request sent by the user equipment is identical with the set dial-up information, thus greatly shortening the time spent on a wireless connection.

The mobile data terminal returns a "successfully connected" message to the user equipment, which indicates that the dial-up connection is completed; and after the dial-up connection is completed, the user equipment can use the mobile data terminal to conduct a data transmission in a wireless network environment.

Figure 2:
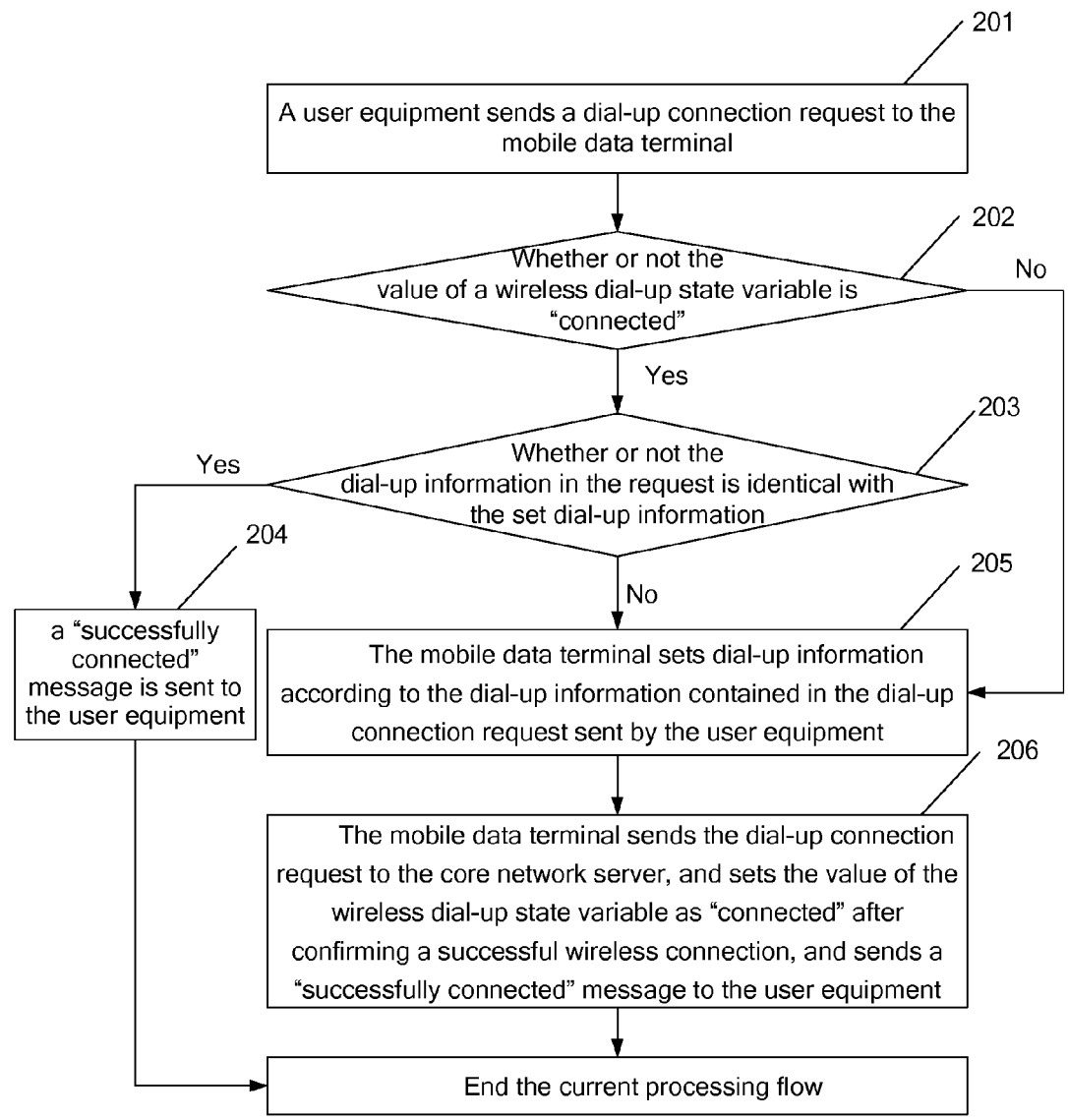
FIG. 2 is a schematic flowchart illustrating a method according to an embodiment of the present disclosure.

FIG. 2 is a schematic flowchart illustrating a dial-up connection method of a mobile data terminal according to a specific embodiment of the present disclosure, as shown in FIG. 2, the dial-up connection method includes the following steps.

Step 201: a user equipment sends a dial-up connection request to the mobile data terminal.

Step 202: after receiving the dial-up connection request, the mobile data terminal determines whether or not the value of a wireless dial-up state variable is "connected", if so, executes step 203, otherwise, executes step 205;

here, after receiving the dial-up connection request, the mobile data terminal directly establishes a wired connection with the user equipment;

if the value of the wireless dial-up state variable is not "connected", that is, the value of the wireless dial-up state variable is "disconnected", it is indicated that no dial-up connection request has been received before by the mobile data terminal and the current dial-up connection request is the initial dial-up connection request; or, after receiving a wireless connection disconnection request from a core network server, the mobile data terminal disconnects the wireless connection with the core network server, resets the dial-up information as null, and clears all the stored resources related to the wireless connection.

Step 203: a determination is made on whether or not the dial-up information in the dial-up connection request is identical with the set dial-up information, if so, executes step 204, otherwise executes step 205;

here, if it is determined that the dial-up information in the dial-up connection request is different from the set dial-up information, the mobile data terminal first sends a wireless connection disconnection request to the core network server to disconnect the wireless connection with the core network server, and then executes step 205.

Step 204: a message of "successfully connected" is sent to the user equipment to end the current flow.

Step 205: the mobile data terminal sets dial-up information according to the dial-up information contained in the dial-up connection request sent by the user equipment and then executes step 206.

Step 206: the mobile data terminal sends the dial-up connection request to the core network server and, after confirming a successful wireless connection, the mobile data terminal sets the value of the wireless dial-up state variable as "connected" and sends a "successfully connected" message to the user equipment, and then the current processing flow is ended.

Here, after sending the dial-up connection request to the core network server, the mobile data terminal starts a timer, and returns a "failed connection" message to the user equipment if no "successfully connected" message is received in a time longer than the time timed by the timer; and after receiving the "failed connection" message, the user equipment re-sends a dial-up connection request to the mobile data terminal to execute the whole process shown in FIG. 2.

In the process above, when needing to disconnect a wired connection, the user equipment sends a wired connection disconnection request to the mobile data terminal; after receiving the wired connection disconnection request from the user equipment, the mobile data terminal only disconnects the wired connection with the user equipment but maintains the wireless connection with the core network server, and at this time, the mobile data terminal remains the set value of the wireless dial-up connection variable and the set dial-up information to wait for the re-sending of a dial-up connection request from the user equipment;

when needing to disconnect a wired connection and a wireless connection synchronously, the user equipment needs to send a request of disconnecting a wireless connection and wired connection to the mobile data terminal; after receiving the request of disconnecting a wireless connection and wired connection, the mobile data terminal disconnects the wired connection with the user equipment and synchronously sends a wireless connection disconnection request to the core network server; and after receiving the wireless connection disconnection request, the core network server disconnects the wireless connection with the mobile data terminal, and at this time, the mobile data terminal resets the value of the wireless dial-up state variable as "disconnected" and resets the dial-up information as null; and the user equipment cannot conduct a data transition after the resetting operation; then, if still needing to continue conducting a data transmission, the user equipment needs to re-send a dial-up connection request and re-executes steps 201, 202, 205 and 206.

The solution provided herein is suitable for a case where dial-up is conducted frequently, for example, the application of a POS, the periodic returning of Global Positioning System (GPS) positioning data or the periodic download of a digital photo frame. Specifically, taking the application of a POS as an example, the card swiping of a user triggers the POS to initiate a dial-up connection request; if a modem determines, after receiving the dial-up connection request, the value of a wireless dial-up state variable is "connected" and the dial-up information contained in the dial-up connection request identical with the dial-up information set by the modem, then the POS directly realizes the interaction with a server terminal, therefore, the whole process starting from the initiation of the dial-up connection request and ending with the completion of the interaction is realized in 2 seconds in general, thus greatly improving the user experience. The solution provided herein is also suitable for a dataflow-based charging case. By adopting the solution provided herein, the time spent on a dial-up connection is greatly shortened, thus improving the user experience.

Figure 3:
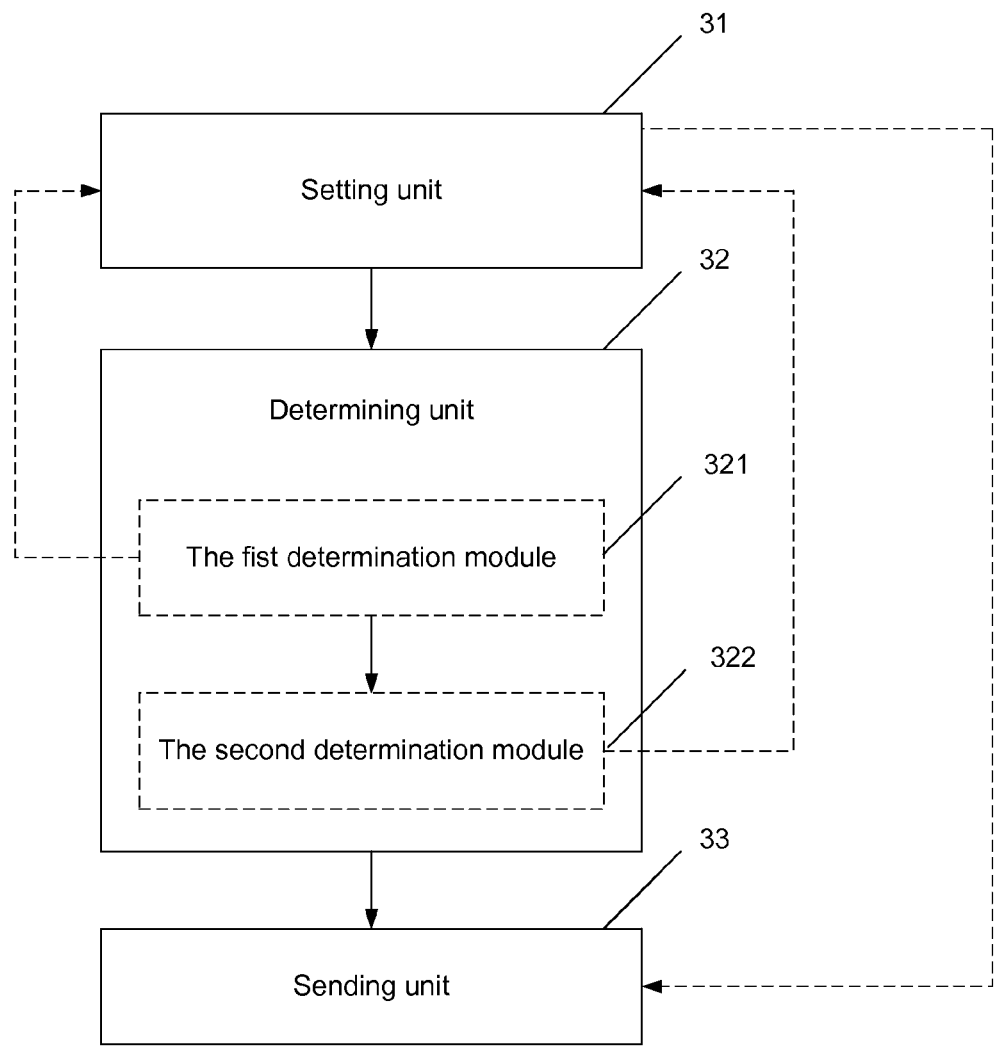
FIG. 3 is a schematic diagram illustrating the structure of a dial-up connection device of a mobile data terminal according to the present disclosure.

Based on the aforementioned method, the present disclosure further provides a dial-up connection device of a mobile data terminal, as shown in FIG. 3, the dial-up connection device includes: a setting unit 31, a determining unit 32 and a sending unit 33, wherein the setting unit 31, is configured to set the value of a wireless dial-up state variable as "connected" after receiving the initial dial-up connection request from a user equipment and set dial-up information, and maintain the value of the wireless dial-up state variable as "connected" after the user equipment disconnects the initial connection with the mobile data terminal;

the determining unit 32, is configured to triggering the sending unit 33 after determining the value of the wireless dial-up state variable as "connected" and the dial-up information in a non-initial dial-up connection request is identical with the set dial-up information, when receiving the non-initial dial-up connection request from the user equipment;

the sending unit 33 is configured to send a "successfully connected" message to the user equipment after receiving triggering information from the determining unit 32.

In the device, the setting unit 31 is further configured to send a dial-up connection request to a core network server, and set the value of the wireless dial-up state variable as "connected" after confirming a successful wireless connection.

The setting unit 31 is further configured to set the value of the wireless dial-up state variable as "disconnected" and set the dial-up information as null when the mobile data terminal is initialized.

The determining unit 32 includes a first determination module 321 and a second determination module 322, wherein the first determination module 321 is configured to determine, after receiving a dial-up connection request from the user equipment, whether or not the value of the wireless dial-up state variable is "connected", and trigger the second determination module 322 when determining the value of the wireless dial-up state variable is "connected"; and trigger the setting unit 31 when determining the value of the wireless dial-up state variable is "disconnected";

the second determination module 322 is configured to determine, after the first determination module 321 determines the value of the wireless dial-up state variable is "connected", whether or not the dial-up information contained in the dial-up connection request is identical with the set dial-up information, and trigger the sending unit 33 when determining the dial-up information in the dial-up connection request is identical with the set dial-up information; and trigger the setting unit 31 when determining the dial-up information in the dial-up connection request is different from the set dial-up information.

Accordingly, the setting unit 31 is further configured to set dial-up information according to the dial-up information in the received dial-up connection request when the first determination module 321 determines the value of the wireless dial-up state variable is "disconnected" or when the second determination module 322 determines the dial-up information in the dial-up connection request is different from the set dial-up information; send a dial-up connection request to the core network server; set the value of the wireless dial-up state variable as "connected" after confirming a successful wireless connection; and trigger the sending unit 33 after completing the setting;

and the sending unit 33 is further configured to send a "successfully connected" message to the user equipment after the setting unit 31 sets the dial-up information and the value of the wireless dial-up state variable.

The mentioned above is only preferred embodiments of the present disclosure but not limitation to the protection scope of the present disclosure, any modifications, equivalent substitutions and improvements devised without departing from the spirit and scope of the disclosure shall belong to the protection scope of the disclosure.

The invention claimed is:

1. A dial-up connection method of a mobile data terminal, comprising:
   setting, by the mobile data terminal, a value of a wireless dial-up state variable as "connected" after receiving an initial dial-up connection request from a user equipment, and setting dial-up information;
   maintaining, by the mobile data terminal, the value of the wireless dial-up state variable as "connected" after the user equipment disconnects an initial connection with the mobile data terminal; and
   sending, by the mobile data terminal, a "successfully connected" message to the user equipment, when determining, after receiving a non-initial dial-up connection request from the user equipment, the value of the wireless dial-up state variable is "connected" and dial-up information in the non-initial dial-up connection request is identical with the set dial-up information.

2. The method according to claim 1, further comprising the step, preceding setting the value of a wireless dial-up state variable and the dial-up information, of:
   setting, by the mobile data terminal, the value of the wireless dial-up state variable as "disconnected" and the dial-up information as null when the mobile data terminal is initialized.

3. The method according to claim 2, further comprising: sending, by the mobile data terminal, a dial-up connection request to a core network server and setting the value of the wireless dial-up state variable as "connected" after confirming a successful wireless connection, when the value of the wireless dial-up state variable and the dial-up information are set.

4. The method according to claim 3, further comprising:
   setting dial-up information according to dial-up information in a dial-up connection request from the user equipment, after receiving the dial-up connection request and determining the value of the wireless dial-up state variable is "disconnected";
   sending a dial-up connection request to the core network server;
   setting the value of the wireless dial-up state variable as "connected" after confirming a successful wireless connection; and
   sending a "successfully connected" message to the user equipment.

5. The method according to claim 3, further comprising:
when determining, after receiving a dial-up connection request from the user equipment, the dial-up information in the dial-up connection request is different from the set dial-up information, setting dial-up information according to dial-up information in the dial-up connection request received from the user equipment;
sending a dial-up connection request to the core network server;
setting the value of the wireless dial-up state variable as "connected" after confirming a successful wireless connection; and
sending a "successfully connected" message to the user equipment.

6. The method according to claim 2, further comprising:
setting dial-up information according to dial-up information in a dial-up connection request from the user equipment, after receiving the dial-up connection request and determining the value of the wireless dial-up state variable is "disconnected";
sending a dial-up connection request to the core network server;
setting the value of the wireless dial-up state variable as "connected" after confirming a successful wireless connection; and
sending a "successfully connected" message to the user equipment.

7. The method according to claim 2, further comprising:
when determining, after receiving a dial-up connection request from the user equipment, the dial-up information in the dial-up connection request is different from the set dial-up information, setting dial-up information according to dial-up information in the dial-up connection request received from the user equipment;
sending a dial-up connection request to the core network server;
setting the value of the wireless dial-up state variable as "connected" after confirming a successful wireless connection; and
sending a "successfully connected" message to the user equipment.

8. The method according to claim 1, further comprising:
setting dial-up information according to dial-up information in a dial-up connection request from the user equipment, after receiving the dial-up connection request and determining the value of the wireless dial-up state variable is "disconnected";
sending a dial-up connection request to the core network server;
setting the value of the wireless dial-up state variable as "connected" after confirming a successful wireless connection; and
sending a "successfully connected" message to the user equipment.

9. The method according to claim 1, further comprising:
when determining, after receiving a dial-up connection request from the user equipment, the dial-up information in the dial-up connection request is different from the set dial-up information, setting dial-up information according to dial-up information in the dial-up connection request received from the user equipment;
sending a dial-up connection request to the core network server;
setting the value of the wireless dial-up state variable as "connected" after confirming a successful wireless connection; and
sending a "successfully connected" message to the user equipment.

10. A dial-up connection device of a mobile data terminal, comprising: a setting unit, a determining unit, and a sending unit, wherein,
the setting unit is configured to:
set a value of a wireless dial-up state variable as "connected" after receiving an initial dial-up connection request from a user equipment, and set dial-up information; and
maintain the value of the wireless dial-up state variable as "connected" after the user equipment disconnects an initial connection with the mobile data terminal;
the determining unit is configured to trigger the sending unit after determining the value of the wireless dial-up state variable is "connected" and dial-up information in a non-initial dial-up connection request is identical with the set dial-up information, when receiving the non-initial dial-up connection request from the user equipment; and
the sending unit is configured to send a "successfully connected" message to the user equipment after receiving triggering information from the determining unit.

11. The device according to claim 10, wherein the setting unit is further configured to set the value of the wireless dial-up state variable as "disconnected" and the dial-up information as null when the mobile data terminal is initialized.

12. The device according to claim 11, wherein the setting unit is further configured to:
send a dial-up connection request to a core network server; and
set the value of the wireless dial-up state variable as "connected" after confirming a successful wireless connection.

13. The device according to claim 12, wherein the determining unit comprises a first determination module and a second determination module, wherein
the first determination module is configured to:
determine, after receiving a dial-up connection request from the user equipment, whether or not the value of the wireless dial-up state variable is "connected";
trigger the second determination module when determining the value of the wireless dial-up state variable is "connected"; and
trigger the setting unit when determining the value of the wireless dial-up state variable is "disconnected"; and
the second determination module is configured to:
determine, after the first determination module determines the value of the wireless dial-up state variable is "connected", whether or not dial-up information in the dial-up connection request is identical with the set dial-up information;
trigger the sending unit when determining the dial-up information in the dial-up connection request is identical with the set dial-up information; and
trigger the setting unit when determining the dial-up information in the dial-up connection request is different from the set dial-up information.

14. The device according to claim 13, wherein:
the setting unit is further configured to:
set dial-up information according to the dial-up information in the received dial-up connection request when the first determination module determines the value of the wireless dial-up state variable is "disconnected" or when the second determination module determines the dial-up information in the dial-up connection request is different from the set dial-up information;

send a dial-up connection request to the core network server;

set the value of the wireless dial-up state variable as "connected" after confirming a successful wireless connection; and trigger the sending unit after completing the setting; and the sending unit is further configured to send a "successfully connected" message to the user equipment after the setting unit sets the dial-up information and the value of the wireless dial-up state variable.

15. The device according to claim 11, wherein the determining unit comprises a first determination module and a second determination module, wherein the first determination module is configured to:

determine, after receiving a dial-up connection request from the user equipment, whether or not the value of the wireless dial-up state variable is "connected";

trigger the second determination module when determining the value of the wireless dial-up state variable is "connected"; and trigger the setting unit when determining the value of the wireless dial-up state variable is "disconnected"; and the second determination module is configured to:

determine, after the first determination module determines the value of the wireless dial-up state variable is "connected", whether or not dial-up information in the dial-up connection request is identical with the set dial-up information;

trigger the sending unit when determining the dial-up information in the dial-up connection request is identical with the set dial-up information; and trigger the setting unit when determining the dial-up information in the dial-up connection request is different from the set dial-up information.

16. The device according to claim 15, wherein:

the setting unit is further configured to:

set dial-up information according to the dial-up information in the received dial-up connection request when the first determination module determines the value of the wireless dial-up state variable is "disconnected" or when the second determination module determines the dial-up information in the dial-up connection request is different from the set dial-up information;

send a dial-up connection request to the core network server;

set the value of the wireless dial-up state variable as "connected" after confirming a successful wireless connection; and trigger the sending unit after completing the setting; and the sending unit is further configured to send a "successfully connected" message to the user equipment after the setting unit sets the dial-up information and the value of the wireless dial-up state variable.

17. The device according to claim 10, wherein the determining unit comprises a first determination module and a second determination module, wherein the first determination module is configured to:

determine, after receiving a dial-up connection request from the user equipment, whether or not the value of the wireless dial-up state variable is "connected";

trigger the second determination module when determining the value of the wireless dial-up state variable is "connected"; and trigger the setting unit when determining the value of the wireless dial-up state variable is "disconnected"; and the second determination module is configured to:

determine, after the first determination module determines the value of the wireless dial-up state variable is "connected", whether or not dial-up information in the dial-up connection request is identical with the set dial-up information;

trigger the sending unit when determining the dial-up information in the dial-up connection request is identical with the set dial-up information; and trigger the setting unit when determining the dial-up information in the dial-up connection request is different from the set dial-up information.

18. The device according to claim 17, wherein:

the setting unit is further configured to:

set dial-up information according to the dial-up information in the received dial-up connection request when the first determination module determines the value of the wireless dial-up state variable is "disconnected" or when the second determination module determines the dial-up information in the dial-up connection request is different from the set dial-up information;

send a dial-up connection request to the core network server;

set the value of the wireless dial-up state variable as "connected" after confirming a successful wireless connection; and trigger the sending unit after completing the setting; and the sending unit is further configured to send a "successfully connected" message to the user equipment after the setting unit sets the dial-up information and the value of the wireless dial-up state variable.

\* \* \* \* \*